United States Patent [19]

Kvande

[11] 4,119,802

[45] Oct. 10, 1978

[54] DIGITAL LINEAR INTERFACE SYSTEM

[76] Inventor: Roger J. Kvande, 5643 Perry Ave., S., Crystal, Minn. 55429

[21] Appl. No.: 749,700

[22] Filed: Dec. 13, 1976

[51] Int. Cl.² .............................................. H04J 1/00
[52] U.S. Cl. ................................. 179/15 FD; 360/20; 340/171 A
[58] Field of Search ...................... 179/15 FD, 15 FS; 360/18, 20, 29; 324/77 E; 328/138, 153; 340/171 A

[56] References Cited

U.S. PATENT DOCUMENTS

| | | | |
|---|---|---|---|
| 3,017,616 | 1/1962 | Runyan | 360/20 |
| 3,497,632 | 2/1970 | Eisenstadt | 360/20 |

Primary Examiner—Kathleen H. Claffy
Assistant Examiner—Joseph A. Popek
Attorney, Agent, or Firm—Warren A. Sturm; Hugh D. Jaeger

[57] ABSTRACT

A digital linear interface system to interface between the output of a tape deck and a separate data input for each of n channels of data input. Each channel of the digital linear interface system consists of a high Q bandpass filter, a rectifier, a peak detector, and a phase locked loop demodulator. A light emitting diode connected between the rectifier and the phase locked loop demodulator lights when the bandpass filter is tuned to the center frequency. The system separates n linear sine waves having data stored on a separate sine wave for each channel.

6 Claims, 1 Drawing Figure

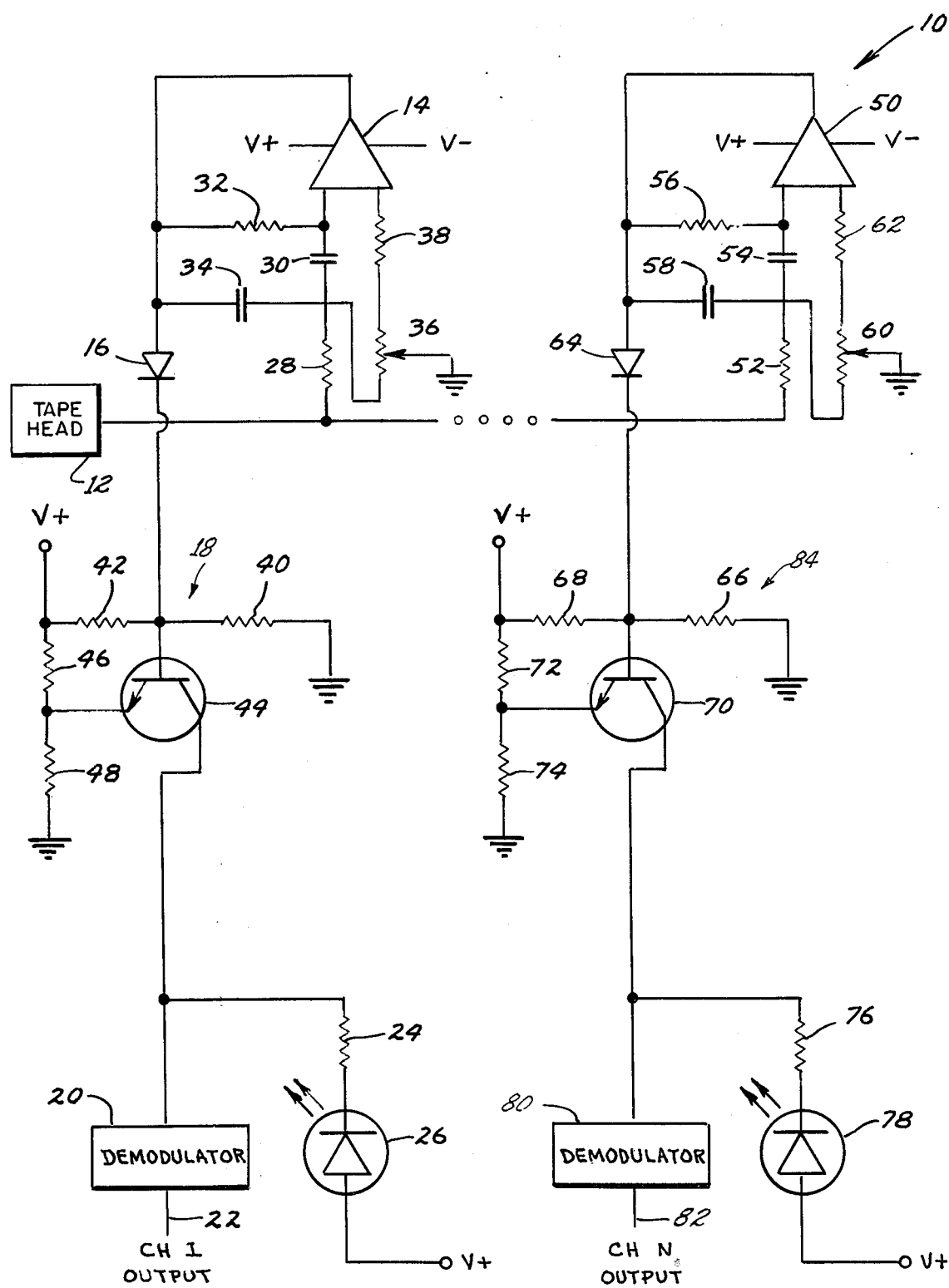

DIGITAL LINEAR INTERFACE SYSTEM

BACKGROUND OF THE INVENTION

1. Field of the Invention

This invention relates generally to a circuit for a digital linear interface system and more particularly pertains to a circuit for interfacing between the tape output head of a digital storage device and N channels of a digital device.

2. Description of the Prior Art

In the field of digital interface systems, it has been a general practice to utilize circuits which convert parallel data to serial format. This serial data is then phase shift modulated on to tape. Therefore, this system is limited due to the overall bandwidth, square wave usage, and bandwidth of digital interface systems required to read the stored information. As a result, information stored is limited by the read out requirements of digital interface system as it is impossible to mix square wave containing information and separating the square waves at a later time.

This invention permits the reading of N channels of information at any speed by utilizing mix sine waves with each sine wave containing digital information for its respective channel.

SUMMARY OF THE INVENTION

The present invention obviates the foregoing disadvantage of the prior art digital interface circuits by providing a N channel digital linear interface system to interface between the output of a tape head and a N channel of data output.

According to an embodiment of the present invention, there is provided a circuit for digital interface between a tape output head and N channels of data output having for each separate data channel of N channels a bandpass filter, a rectifier, a resistor-transistor peak detector, and a phase lock loop demodulator. A light emitting diode connected between the rectifier and phase locked loop demodulator lights when the bandpass filter is tuned to the center frequency.

A significant aspect and feature of the present invention is that the digital linear interface system can be utilized to interface for N channels of data and is only limited by the number of data input channels.

Having briefly described one embodiment of the present invention, it is a principal object thereof to provide a new and improved digital linear interface system.

An object of the present invention is to provide a digital linear interface system having a N channel capability and connected between the output of a tape deck and a separate input for each of N channels of data output.

Another object is to provide each channel of the digital linear interface system with a separate center frequency and high Q for each bandpass filter to separate N sine waves have digital information for each channel corresponding to a separate sine wave frequency.

Still another object is to provide a visual indication of when each bandpass filter of the digital interface system is tuned to the center frequency.

A further object of the invention is to provide a system which shall separate N sine waves at different frequencies and read N channels of data at any speed.

BRIEF DESCRIPTION OF THE DRAWING

Other objects and many of the attendant advantages of this invention will be readily appreciated as the same becomes better understood by reference to the following detailed description when considered in connection with the accompanying drawings, in which like reference numerals designate like parts throughout the figures thereof and where:

FIG. 1 illustrates a circuit diagram of the invention.

DESCRIPTION OF THE PREFERRED EMBODIMENT

FIG. 1 illustrates a digital linear interface system 10 which interfaces between an output of a tape head 12 and a input for each of N channels of data output. An output of a tape head 12 is fed into, for each individual channel, a bandpass amplifier 14, a rectifier 16, a resistor-transistor network 18, and a phase lock loop demodulator 20 in series to the output of channel 1 as for way of example of the N channels of data output. A light emitting diode 26 having a circuit limiting series resistor 24 connects between the resistor-transistor network 18 and the phase lock loop demodulator 20 to ground to indicate when the bandpass amplifier 14 for channel 1 is tuned to the center frequency of the bandpass.

The circuitry for each of the other N channels between the output of the tape head 12 and the output for each of the 2 through N channels of the data output is idential to that of channel 1.

The signal from the tape head 12 connects to one of the inputs of the bandpass amplifier 14 through a resistor 28 and a capacitor 30 in series. The output of the bandpass filter 14 connects through a loop to the previous referred to input through a resistor 32. Also, the output of the bandpass amplifier 14 connects to the other input of the bandpass amplifier 14 through a series connection of a capacitor 34, a variable resistor 36, and a resistor 38. The output of the bandpass filter 14 also connects to the cathode of rectifier 16.

The anode of rectifier 16 connects to the resistor-transistor network 18 junction of resistor 40 and 42 and the base of a transistor 44. Resistor 42 connects to a resistor 46 and resistor 48 which connects to ground. The base of the transistor 44 connects to the juncton of the resistors 46 and 48. The collector of the transistor 44 connects to the phase locked loop demodulator 20. The output of the demodulator 20 is the data output for channel 1. A current limiting resistor 24 in series with light emitting diode 26 connects from the junction of the collector of the transistor 44 and the demodulator 20 to ground to indicate when the bandpass filter is tuned.

Each additional channel, that is, channel 2 through channel N uses identical circuitry to that for channel 1.

The last channel designated as channel output N, 82, uses a bandpass amplifier 50, a rectifier 64, a resistor-transistor network 84, and a phase lock loop demodulator.

The signal from the tape head connects to one of the inputs of the bandpass filter 50 through a series connection of a resistor 52 and a capacitor 54. The output of the bandpass amplifier 50 connects through a loop and is coupled to the previous referred to input of the bandpass amplifier 44 through a resistor 56. Also, the output of the bandpass amplifier 44 connects to the other input of the bandpass amplifier 44 through a series connection of a capacitor 58, a variable resistor 60, and a resistor 62. The output of the bandpass amplifier 44 also connects to the cathode of rectifier 64, and may be coupled directly to the transistor 70.

The anode of rectifier 64 connects to the resistor-transistor network 84 junction of resistors 66 and 68 and the base of a transistor 70. Resistor 68 connects to a resistor 72 and resistor 74 which connects to ground. The emitter of transistor 70 connects to the junction of the resistors 72 and 74. The collector of the transistor 70 connects to the phase locked loop demodulator 50. The output 82 of the demodulator 80 is the data output for channel N. A current limiting resistor 76 in series with light emitting diode 78 connects from the junction of the collector of the transistor 70 and the demodulator 50 to ground to indicate when the bandpass filter is tuned to the center frequency of the bandpass.

The circuitry for the channels 2 through N − 1 is identical to the circuitry of channel 1 and channel N. The signal is received from tape head 12 and demodulated by each channel circuitry to its respective output for each data channel.

PREFERRED MODE OF OPERATION

The digital linear interface system 10 connects between the output of a tape head 12 and N channels of a digital device. The digital linear interface system 10 interfaces and demodulates the information for N channels and is only limited by the frequency output of the tape head 12 which feeds into line 12.

Each of the bandpass amplifiers, for example, 14, etc., should have a high slew rate of 60 volts per microsecond, a settling time of 300 nanoseconds, and a high Q. Variable potentiometer 36 sets the Q and frequency of the bandpass amplifier 14 in addition to the component values of the capacitors 30 and 34, and the resistors 28, 32 and 38. The bandpass amplifier may be an operational amplifier, by way of example and for purposes of illustration only, a NA 772 high slew rate operational amplifier manufactured by Fairchild Instruments.

The resistor-transistor network 18 functions as a peak detector 18 taking the peak of the bandpass signal and feeding it into the phase lock loop 20. The harmonic and noise on the signal is necessary to start transistor 44 conducting.

The phase locked loop 20 demodulates the output of the peak detector 18 which is then fed to the data output of channel 1. A Signetics type 560 phase locked loop is utilized having a minimum of input for lock of 120 microvolts and a frequency response of 15 megahertz. Each of the bandpass amplifiers 14 for channel 1 and 50 for channel N including those inbetween are selectively tuned to the center frequency of the bandpass by potentiometer 36 for channel 1 and the respective potentiometers for the other channels giving a visual light indication from light emitting diode 24 when each bandpass amplifier is tuned to the center frequency of the pass band. The value of potentiometer 36 is chosen so that its midrange is in the midrange of the bandpass amplifier 14 for the values of resistors 22, 32 and 38, and capacitors 30 and 34.

The digital linear interface system 10 allows the reading of data which can be expressed in terms of bits per second and is only limited by the number of bits stored on a tape. The recorded information which can be read into the digital linear interface system 10 may have N channels or from a practical standpoint, a number no less than 8 bits or a common length of 16 bits to a maximum of 72 bits for systems in use today.

The digital information can be stored onto a standard recording tape or onto, for example, a four channel tape system such as a cassette recorder through commonly known recording techniques wherein there is an oscillator bank having N different frequencies and a parity bit through which the data is read to a voltage control modulator and the information is combined onto a sine wave frequency for each of the oscillators and the sine waves are mixed. Subsequently, the tape may be played back at a faster speed than what the information was recorded at and may be fed into line 12 of the digital linear interface system 10.

The digital linear interface system 10 decodes and separates the information through each bandpass amplifier, etc., corresponding to each frequency of the oscillator bank. The information will be decoded and outputted through the N channels of the digital linear interface system beginning with channel 1 to Nth channel.

Various modifications are contemplated and may obviously be resorted to by those skilled in the art without departing from the apparent scope of the invention as hereinafter defined by the appended claims and only a preferred emodiment thereof has been disposed.

What is claimed is:

1. Digital linear interface system to interface from the output of a tape head having N mixed sine waves storing digital information on each sine wave for each respective channel to N channels of data output comprising an output from said tape head; a bandpass filter means, rectifier means, peak detector means, and demodulator means whereby each means is in series for each of said corresponding N channels of data output and each series connection connects between said output from said tape head and said N channels of digital input.

2. Digital linear interface system of claim 1 wherein said bandpass filter means comprises a high Q bandpass filter.

3. Digital linear interface system of claim 1 wherein said peak detector means comprises a resistor-transistor network.

4. Digital linear interface system of claim 3 wherein said bandpass filter conducts a peak and said resistor-transistor network dissipates harmonics and noise.

5. Digital interface system of claim 1 wherein said demodulator means comprises a phase locked loop.

6. Digital interface system of claim 2 wherein said bandpass filter comprises an operational amplifier.

* * * * *